US010664872B2

(12) United States Patent
Callahan

(10) Patent No.: US 10,664,872 B2
(45) Date of Patent: *May 26, 2020

(54) SYSTEMS AND METHODS FOR GENERATING NETWORK INTELLIGENCE THROUGH REAL-TIME ANALYTICS

(71) Applicant: Level 3 Communications, LLC, Broomfield, CO (US)

(72) Inventor: Jonathan Callahan, Lakewood, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 446 days.

This patent is subject to a terminal disclaimer.

(21) Appl. No.: 15/595,401

(22) Filed: May 15, 2017

(65) Prior Publication Data

US 2017/0249672 A1    Aug. 31, 2017

Related U.S. Application Data

(63) Continuation of application No. 14/256,163, filed on Apr. 18, 2014, now Pat. No. 9,652,784.

(51) Int. Cl.
*G06Q 30/02* (2012.01)
*H04L 29/08* (2006.01)
(Continued)

(52) U.S. Cl.
CPC ..... *G06Q 30/0269* (2013.01); *G06Q 30/0201* (2013.01); *H04L 61/1511* (2013.01);
(Continued)

(58) Field of Classification Search
CPC .............................. G06Q 10/00; G06Q 40/00
(Continued)

(56) References Cited

U.S. PATENT DOCUMENTS 7,869,425 B2 * 1/2011 Elliott ..................... H04L 12/14
370/352
8,635,062 B2 * 1/2014 Sathish ............... G06F 16/9535
704/9

(Continued)

FOREIGN PATENT DOCUMENTS

CN        102739683 A    10/2012
WO    WO-2013188821 A1   12/2013

OTHER PUBLICATIONS

Yang "Building Content Distribution Network: A Solution to achieve QoS on Internet", Dec. 2011, IEEE, pp. 1-4 (Year: 2011).*

(Continued)

*Primary Examiner* — Romain Jeanty

(57) ABSTRACT

Implementations described and claimed herein provide systems and methods for generating network intelligence based on network data. In one implementation, a network traffic dataset representative of network traffic across one or more ports of a primary network is obtained. The ports are associated with a secondary network in communication with the primary network. A content distribution network log associated with the secondary network is obtained. The content distribution log includes a history of content requests. A domain name system log associated with the secondary network is obtained. The domain name system log includes one or more Internet Protocol addresses. Network intelligence is generated based on the network traffic dataset, the content distribution network log, and the domain name system log. The network intelligence may be customer analytics, an aggregated data feed, and/or recommendations for inventory placement.

23 Claims, 5 Drawing Sheets

(51) Int. Cl.
   *H04L 29/12* (2006.01)
   *H04L 12/24* (2006.01)
(52) U.S. Cl.
   CPC .............. *H04L 67/20* (2013.01); *H04L 67/22* (2013.01); *H04L 67/289* (2013.01); *H04L 67/306* (2013.01); *H04L 41/142* (2013.01)
(58) Field of Classification Search
   USPC ........................................................ 705/7.29
   See application file for complete search history.

(56) References Cited

U.S. PATENT DOCUMENTS

| | | | |
|---|---|---|---|
| 8,938,765 B2 * | 1/2015 | Benya | H04N 7/17318 |
| | | | 709/231 |
| 9,172,591 B2 * | 10/2015 | Eggleston | H04L 41/5009 |
| 9,565,117 B2 * | 2/2017 | Dahod | H04L 12/66 |
| 2006/0031407 A1 | 2/2006 | Dispensa et al. | |
| 2009/0210528 A1 | 8/2009 | Swildens | |
| 2010/0162359 A1 | 6/2010 | Casey et al. | |
| 2011/0004446 A1 | 1/2011 | Dorn et al. | |
| 2011/0040635 A1 | 2/2011 | Simmons et al. | |
| 2011/0153864 A1 | 6/2011 | Prasad et al. | |
| 2011/0314142 A1 | 12/2011 | Newton | |
| 2012/0011563 A1 | 1/2012 | Newton | |
| 2012/0253950 A1 | 10/2012 | Parker | |
| 2012/0317151 A1 * | 12/2012 | Ruf | H04L 41/5067 |
| | | | 707/802 |
| 2013/0024503 A1 * | 1/2013 | Neerdaels | H04L 29/06 |
| | | | 709/203 |
| 2013/0132484 A1 | 5/2013 | Berezecki | |
| 2013/0159472 A1 * | 6/2013 | Newton | H04L 67/2852 |
| | | | 709/219 |
| 2013/0282897 A1 | 10/2013 | Siegel et al. | |
| 2015/0302481 A1 | 10/2015 | Callahan | |

OTHER PUBLICATIONS

Extended European Search Report, dated Nov. 9, 2017, Application No. 15780572.2, filed Apr. 17, 2015; 13 pgs.
International Preliminary Report on Patentability, dated Oct. 18, 2016, Int'l Appl. No. PCT/US15/026431, Int'l Filing Date Apr. 17, 2015; 11 pgs.
International Search Report, dated Jul. 20, 2015, In'tl Appl. No. PCT/US15/026431, Int'l Filing Date Apr. 17, 2015; 3 pgs.
Written Opinion of the International Searching Authority, dated Jul. 20, 201, In'tl Appl. No. PCT/US15/026431, Int'l Filing Date Apr. 17, 2015; 9 pgs.

* cited by examiner

SYSTEMS AND METHODS FOR GENERATING NETWORK INTELLIGENCE THROUGH REAL-TIME ANALYTICS

CROSS-REFERENCE TO RELATED APPLICATIONS

This application is a continuation of and claims the benefit of priority from U.S. application Ser. No. 14/256,163, entitled "SYSTEMS AND METHODS FOR GENERATING NETWORK INTELLIGENCE THROUGH REAL-TIME ANALYTICS," filed Apr. 18, 2014, the contents of which are fully incorporated by reference herein for all purposes.

TECHNICAL FIELD

Aspects of the present disclosure relate to network data collection, aggregation, and analysis, among other functions, and more particularly to the generation of network intelligence through real-time analytics based on network data.

BACKGROUND

Companies providing a product or service to end users, for example via a website, often rely on various types of advertising to attract the end users and increase traffic to the website. Conventional advertising strategies often involve either a recurring indiscriminate broadcast to a general population of recipients or a focused broadcast to a target demographic. With such strategies, the effect of the advertisement in reaching the target demographic or generating a desired response, such as increasing traffic to the website, is unknown or uncertain. For example, the demographic of people that watch a certain television show may be known. If the demographic matches a target demographic for a website, an advertisement for the website may be presented during the television show with the hopes that it reaches the target demographic and increases traffic to the website. An actual increase in traffic to the website, however, may be attributable to any number of factors. It is challenging to correlate any change in traffic to an event, such as an advertisement, with reasonable certainty.

Further, a company will often only have data regarding actions taken by end users within the network operated by the company and regarding how the end users were directed to the network. For example, a company operating a content distribution network (CDN) may have data about content requests and deliveries but not information about the users requesting the content. Similarly, while a company may have data about how a user was directed to a website (e.g., via a link in an advertisement or by entering a Uniform Resource Locator (URL) in a web browser), information about what the user was doing before being directed to the website or after leaving the website is generally unknown.

Outside the advertisement context, networks are generally not equipped to collect sufficient data to understand the behavior, preferences, or attributes of current or potential end users. An understanding of this would enable the companies operating those networks to adjust their business models, advertisement strategies, and/or various features of their product or service to attract new customers and meet customer expectations.

It is with these observations in mind, among others, that various aspects of the present disclosure were conceived and developed.

SUMMARY

Implementations described and claimed herein address the foregoing problems by providing systems and methods for generating network intelligence based on network data. In one implementation, a network traffic dataset representative of network traffic across one or more ports of a primary network is obtained. The ports are associated with a secondary network in communication with the primary network. A content distribution network log associated with the secondary network is obtained. The content distribution log includes a history of content requests. A domain name system log associated with the secondary network is obtained. The domain name system log includes one or more Internet Protocol addresses. Network intelligence is generated based on the network traffic dataset, the content distribution network log, and the domain name system log.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
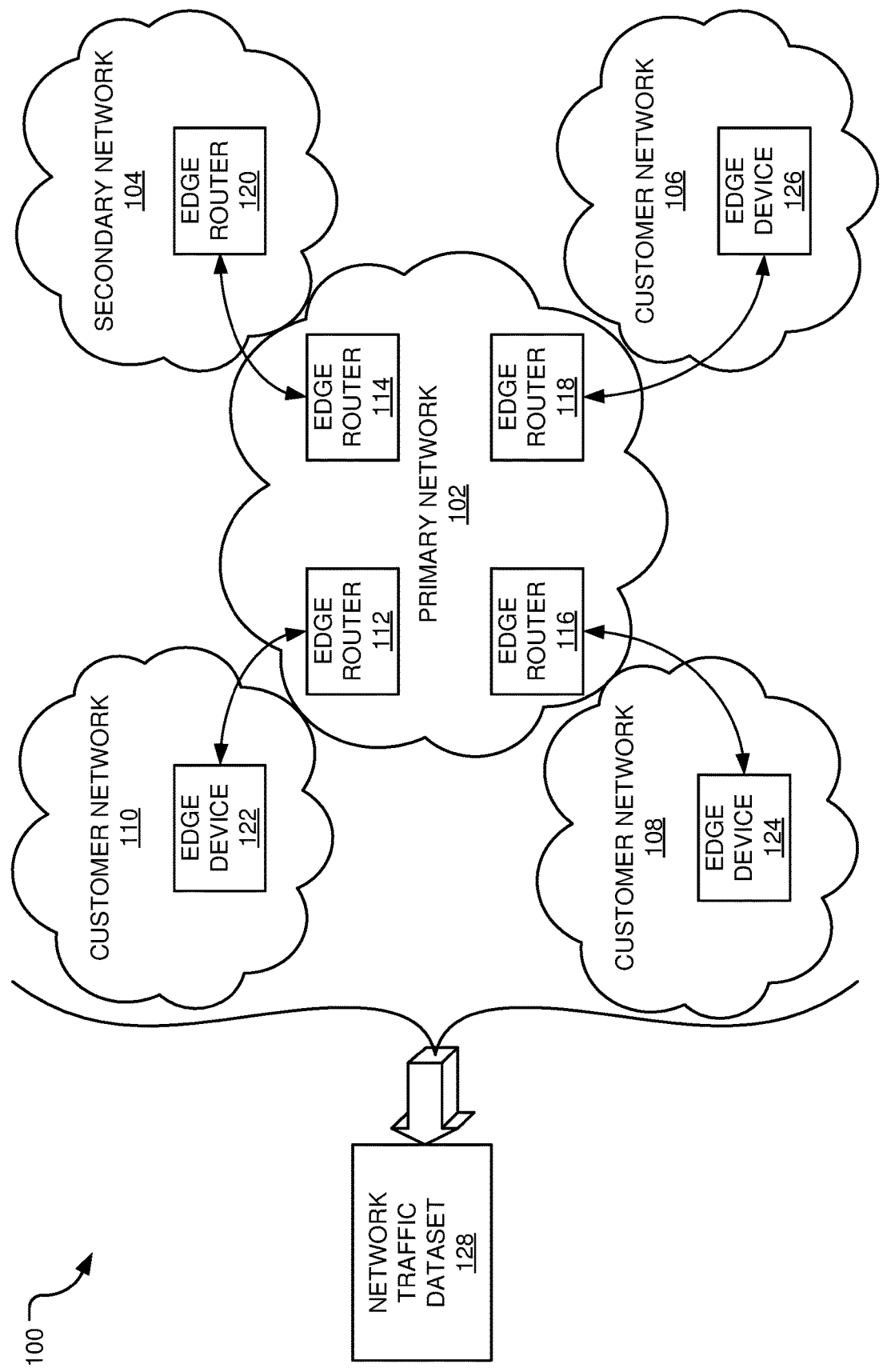
FIG. 1 illustrates an example network environment for monitoring and correlating network traffic data.

Aspects of the present disclosure involve systems and methods for collecting, aggregating, and analyzing network data and for generating network intelligence based on the network data. In one particular aspect, the network intelligence is generated for a secondary network in communication with a primary network. A company operating the secondary network may provide a product or service to end users. For example, the secondary network may host a website offering a product for sale or providing a service, such as content (e.g., music or video) streaming or social networking.

The primary network is uniquely positioned to capture and analyze network data corresponding to the secondary network. The network data includes a network traffic dataset, a Content Distribution Network (CDN) log, and a Domain Name System (DNS) log. Generally, the network traffic dataset is obtained through the monitoring and correlation of network traffic over one or more ports in the primary network. Stated differently, network traffic data and statistics are gathered from the interaction of the primary network with the secondary network and the customer networks of the end users and correlated to form a network traffic dataset.

An end user may request content on a user device connected to a CDN via a customer network. For example, the end user may wish to stream a movie on a computer. To start the movie, a link to the movie in a website may be selected, which causes a request to be sent to a directory server providing a DNS service in the CDN. The directory server responds to the request by providing a network address (e.g., an Internet Protocol (IP) address) from which the movie may be retrieved. The CDN log includes a history of such content requests from and deliveries to various IP addresses associated with end users, and the DNS log includes a history of network addresses to which the various IP addresses were resolved in response to the selection or input of a link (e.g., a URL or other identifier).

Network intelligence is generated through real-time analytics based on network data, including the network traffic dataset, the CDN log, and the DNS log. The network intelligence generally provides a behavior profile of current and potential end users alone, collectively, or in subsets. The network intelligence may include customer analytics, an aggregated data feed, and/or recommendations for inventory placement.

The customer analytics represent transactions of the end users in the secondary network. Stated differently, the customer analytics provide statistics and demographics of the end users, as well as a behavior profile specifying the activity of end users corresponding to the secondary network. The aggregated data feed determines an influence of an action (e.g., a single advertisement; an advertisement campaign; one or more popular culture, political, or news events; etc.) on network traffic to the secondary network. Stated differently, the aggregated data feed correlates an action to any change in traffic to the secondary network with reasonable certainty. The recommendations for inventory placement identify one or more relevant pieces of inventory (e.g., an advertisement) to present to an end user(s), for example, before, during, or after the presentation of content served by a CDN based on a behavior profile of the end user(s). The network intelligence may be output for display on a graphical user interface. Alternatively or additionally, the network intelligence may be output as one or more web services, business logic, one or more electronic data feeds, or the like. A company operating the secondary network may use the network intelligence to adjust business models, advertisement strategies, and/or various features of offered products or services to attract new customers and meet customer expectations.

In one implementation, the network intelligence is generated in response to a request for content from an IP address, for example, associated with a user device. The network data, including the network traffic dataset, the CDN log, and the DNS log, is serialized, correlated, and stored in a non-relational database in a storage cluster. In response to the request for content from the IP address, an analytics engine queries and extracts network data pertaining to the IP address from the non-relational database and generates the network intelligence based on the extracted network data and the request for content. In one implementation, the network intelligence is a recommendation for advertisement placement before, during, or after the presentation of the requested content. The advertisement is customized for the IP address.

For example, an end user may stream a movie on a computer. To start the movie, the computer sends a request for a segment of the movie. In response to the request for the segment of the movie, network data pertaining to the IP address of the computer is extracted, and network intelligence is generated for the IP address based on the extracted network data. The network intelligence may indicate that the end user is currently interested in attending a particular event and identify an advertisement for the particular event to present to the end user while the movie plays. The network intelligence is thus customized to the interests of the end user. As such, two different end users watching the same movie may be presented with different, customized advertisements.

Turning to FIG. 1, an example network environment 100 for monitoring and correlating network traffic data is shown. In one implementation, a primary network 102 is in communication with various other networks, including a secondary network 104 and customer networks 106, 108, and 110. The primary network 102 is a large provider that facilitates communication and exchanges traffic between the secondary network 104 and the customer networks 106, 108, and 110. The customer networks 106, 108, and 110 may be wired or wireless networks under the control of or operated/maintained by one or more entities, such as an Internet Service Provider (ISP) or Mobile Network Operator (MNO), that provide access to the primary network 102. Thus, for example, the customer networks 106, 108, and 110 may provide Internet access to one or more end users. Although three customer networks and one secondary network are shown in the network environment 100, more or fewer customer and/or secondary networks may interface with the primary network 102.

The primary network 102 includes multiple ingress/egress routers (e.g. edge routers 112-118), which may have one or more ports, in communication with the secondary network 104 and the customer networks 106-110. For example, the edge router 114 of the primary network 102 interfaces with an edge router 120 of the secondary network 104, and the edge routers 112, 116, and 118 of the primary network 102 interface with edge devices 122, 124, and 126 of the customer networks 110, 108, and 106, respectively. The edge devices 122, 124, and 126 are network devices that provide entry points into the primary network 102 via the customer networks 106-110. Stated differently, one or more end users may connect to the Internet with a user device using one of the edge devices 122-126. The user device may be any form of computing device, including, without limitation, a personal computer, a terminal, a workstation, a mobile phone, a mobile device, a tablet, a set top box, a multimedia console, a television, or the like. In some implementations, the edge routers 112-118 communicate with each other across the primary network 102 over multiple iterations and hops of other routers contained within the primary network 102. Similarly, the customer networks 106-110 and/or the secondary network 104 may include edge routers that communicate with other routers via one or more hops and interface with another network, gateway, user device, or the like.

In one implementation, the networks 102-110 exchange network traffic using border gateway protocol (BGP). BGP is a telecommunications industry standard for an inter-autonomous system routing protocol (i.e., a connected group of one or more IP prefixes run by one or more network operators which has a single and clearly defined routing policy), including support for both route aggregation and Classless Inter Domain Routing (CIDR) between the networks 102-110 and one or more interconnection points.

Network traffic data is captured on the edge routers 112-118 and enriched using BGP data, router details, location information, volume adjustment data, customer identifiers, and the like. Stated differently, network traffic data and statistics are gathered from the interaction of the primary network 102 with the secondary network 104 and the customer networks 106-110 and correlated to form a network traffic dataset 128. The network traffic dataset 128 provides information about sources, destinations, ingress/egress points, and other information about network traffic across the primary network 102 that is associated with the secondary network 104. In other words, the network traffic dataset 128 may be used to evaluate network behavior and network traffic patterns of the primary network 102 with respect to network traffic transceived between (i.e., sent to and received by) the secondary network 104 and the customer networks 106-110.

The network traffic dataset 128 includes information on the identity of who sends and receives network traffic at a particular router interface (e.g., the edge routers 112-118) in the primary network 102. This information may include, for example, a router identifier, an interface identifier for the particular router, an origin Autonomous System (AS) number, a destination AS number, and the like. The network traffic dataset 128 may also include an estimation or approximation of the amount or rate of traffic transceived at the edge router 114 in the primary network 102 corresponding to the secondary network 120. In one implementation, the network traffic dataset 128 includes network traffic amounts and rates collected using Simple Network Management Protocol (SNMP) counters and messaging. In another implementation, the network traffic dataset 128 includes information collected from BGP tables associated with the connectivity relationships of the primary network 102 with the secondary network 104 and the customer networks 106-110. The BGP tables may include routing tables having connectivity information (e.g., IP addresses, AS paths, etc.) that provide which destinations are reachable from a particular ingress router in a network that interfaces with an egress router in the primary network 102. With egress AS numbers, it may be determined to which network (e.g., the secondary network 104 and/or the customer networks 106-110) network traffic is being sent.

In one implementation, the network traffic dataset 128 specifies the sender and the receiver of a data transmission over the primary network 102. For example, a router interface identifier, an IP address, router device identifier, or the like may be used to determine the network from which a transmission is being sent. Similarly, the network traffic dataset 128 may be used for geo-location purposes to determine a geographic location or proximity of a sender and a receiver of a data transmission (e.g., associated with an origination and/or destination IP address).

Figure 2:
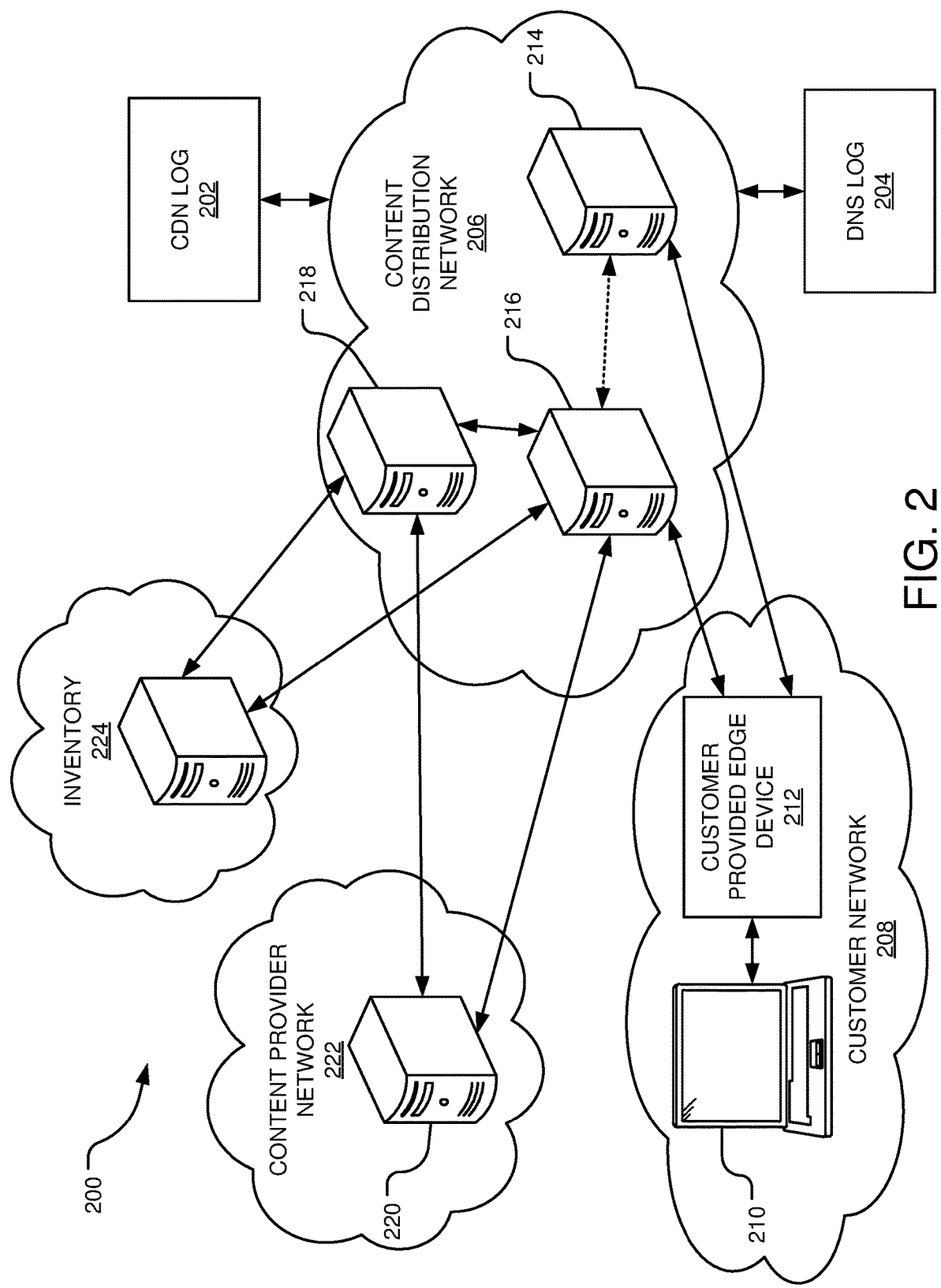
FIG. 2 shows an example network environment for obtaining a content distribution network log and a domain name system log.

For a detailed discussion of an example network environment 200 for obtaining a CDN log 202 and a DNS log 204, reference is made to FIG. 2. As shown, the network environment 200 includes a CDN 206, which may include components of one or more networks. In one implementation, the CDN 206 is communicatively coupled to one or more customer networks 210. The customer network 210 may be wired or wireless networks under the control of or operated/maintained by one or more entities, such as an ISP or MNO, that provide access to the CDN 206. Thus, for example, the customer network 208 may provide Internet access to one or more user devices 210 via a customer provided edge device 212, as described herein.

The CDN 206 is capable of providing inventory to the user device 210. The inventory may be various forms of webpages or content, including, without limitation, videos, multimedia, images, audio files, text, documents, software, data files, patches, and other electronic resources. The inventory may include available advertisements. The user device 210 is configured to request, receive, process, and present the inventory. In one implementation, the user device 210 includes an Internet browser application with which a link (e.g. a hyperlink) to inventory may be selected or otherwise entered, causing a request to be sent to a directory server 214 in the CDN 102.

The directory server 214 responds to the request by providing a network address (e.g., an IP address) where the content associated with the selected link can be obtained. In one implementation, the directory server 214 provides a DNS service, which resolves an alphanumeric domain name to an IP address. The directory server 214 resolves the link name (e.g., a URL or other identifier) to an associated network address from which the user device 210 can retrieve the inventory. The DNS log 204 includes a list of DNS requests and information about the requests, including the network addresses. It will be appreciated by those skilled in the art that the DNS log 204 may also be obtained in other network environments not involving content distribution.

In one implementation, the CDN 206 includes an edge server 216, which may cache content from another server to make it available in a more geographically or logically proximate location to the user device 210. The edge server 216 is configured to provide requested content to a requestor, which may be the user device 210 or an intermediate device, for example, the customer provided edge device 212 or other network component in the customer network 208 or in the CDN 206. In one implementation, the edge server 216 provides the requested content that is locally stored in cache. In another implementation, the edge server 216 retrieves the requested content from another source, such as a media access server, a content distribution server 218, or a content origin server 220 of a content provider network 222. The content is then served to the user device 210, the customer provided edge device 212, or another intermediate device in response to requests for content. The CDN log 202 includes a list of content requests and responses to the requests, including what content or other inventory was requested and served.

As described herein, network intelligence generated through real-time analytics based on the network traffic dataset 124, the CDN log 202, and the DNS log 204 may include recommendations for inventory placement, such as placement of advertisements. In one implementation, based on the network intelligence, an advertisement is selected from an inventory pool 224 and served to the user device 210 before, during, or after the presentation of content. The inventory pool 224 may be maintained by the CDN 206 and/or one or more networks in communication with the CDN 206.

More specifically, in one implementation, a request for content from the user device 210 is received at the directory server 214, for example, in a CDN cluster within the CDN 206. As described herein, the directory server 214 responds to the request by providing a network address (e.g., an IP address) where the content can be obtained. In response to the request for content, the CDN 206 concurrently queries a storage cluster (not shown) for network intelligence for the user device 210. The storage cluster receives, serializes, and stores the network traffic dataset 124, the CDN log 202, and the DNS log 204 in a non-relational database. An analytics engine in the storage cluster receives the query and extracts network data pertaining to the user device 210 from the non-relational database. The analytics engine generates network intelligence in substantially real time for the user device 210 based on the extracted network data. For example, the network intelligence may identify one or more areas of interest for the end user associated with the user device 210 and select one or more advertisements from the inventory pool 224 corresponding to the identified areas of interest. The requested content is then served to the user device 210 with the advertisements presented before, during, or after the presentation of the content. The advertisements are thus customized for the end user associated with the user device 210. As such, requests for the same content received from different user devices 210 may be presented with different advertisements from the inventory pool 224 based, for example, on the interests of the end users associated with each of the user devices 210.

Figure 3:
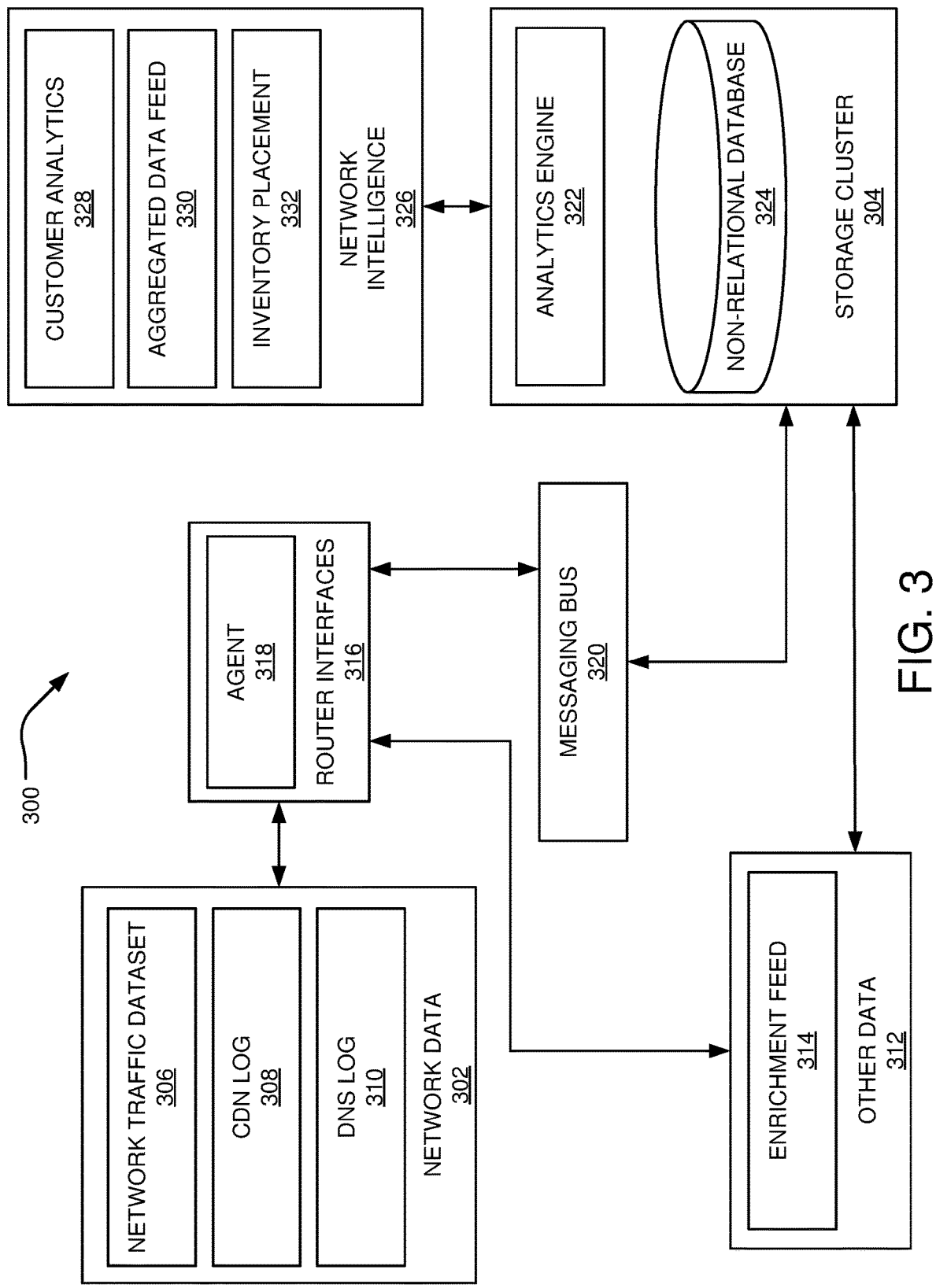
FIG. 3 shows an example system for generating network intelligence based on network data.

As can be understood from FIG. 3, an example system 300 generates network intelligence for a secondary network in communication with a primary network based on network data. A company operating the secondary network may provide a product or service to end users. For example, the secondary network may host a website offering a product for sale or providing a service, such as content streaming or social networking.

In one implementation, network data 302 is provided to a storage cluster 304. The primary network includes edge devices, servers, and other network components uniquely positioned to capture the network data 302. In one implementation, the network data 302 includes a network traffic dataset 306, CDN log data 308, and DNS log data 310.

The network traffic dataset 306 is obtained through the monitoring and correlation of network traffic over one or more ports in the primary network, for example, as described with respect to FIG. 1. The CDN log 308 includes a history of content requests from and deliveries to various IP addresses, and the DNS log 310 includes a history of network addresses to which various IP addresses were resolved in response to the selection or input of a link (e.g., a URL or other identifier). The CDN log 308 and the DNS log 310 may be obtained, for example, as described with respect to FIG. 2.

Other data 312 may be provided to the storage cluster 304. In one implementation, the other data 312 includes one or more enrichment feeds 314 having data that: is correlated with the end users (e.g., the IP addresses of user devices or edge devices); relates to one or more networks in communication with the primary network (e.g., secondary or customer networks); and/or enhances the network data 302.

The storage cluster 304 is configured to serialize the network data 302 and the other data 312 by parsing, tagging, and/or associating data elements for storage and analysis. The storage cluster 304 may include various modules, components, systems, infrastructures, and/or applications that may be local, remote, and/or combined in various ways, including, for example, into a single software application or multiple software applications. The network data 302 and the other data 312 provided to the storage cluster 304 is serialized and stored in one or more non-relational databases 324. The storage cluster 304 includes a distributed, scalable storage layer that is configured to store a large volume of structured and unstructured data in the non-relational database 324. In one implementation, the storage cluster 304 replicates and distributes blocks of data through cluster nodes, along with numerous other features and advantages. As such, the storage cluster 304 generally manages the processing, storage, analysis, and retrieval of large volumes of data in the non-relational database 324. The storage cluster 304 may involve Storm, Hadoop®, or the like, for example.

In one implementation, the network data 302 and/or the other data 312 is received at one or more router interfaces 316, which is running an agent 318, such as Flume™. The agent 318 extracts, ingests, and imports the network data 302 and/or the other data 312 into the storage cluster 304, where the network data 302 and/or the other data 312 is transformed, aggregated, parsed, and assigned relevancy values and locations for storage in the non-relational database 324. In one implementation, prior to input into the storage cluster 304, the network data 302 and/or the other data 312 is timestamped using a messaging bus 320, which may be, for example, Apache™ Kafka, zeromq, or the like.

The storage cluster 304 serializes and stores the network data 302 and/or the other data 312 in the non-relational database 324, such that network intelligence 326 may be generated based on a query. In one implementation, the query is submitted in response to a request for content from a user device, and the query corresponds to the IP address associated with the user device requesting the content. An analytics engine 322 processes a query in multiple parts at the cluster node level and aggregates the results to generate the network intelligence 326. In one implementation, the analytics engine 322 receives a query in structured query language (SQL), extracts and aggregates data stored in the non-relational database 324, and outputs the network intelligence 326 in substantially real time in a format enabling further action, management, analysis, and/or merging with other data sources. The analytics engine 322 may generate the network intelligence 326 using machine learning techniques, which generally refers to a machine learning through observing data that represents incomplete information about statistical happenings and generalizing such data to rules and/or algorithms that make predictions for future data, trends, and the like. Machine learning typically includes "classification" where machines learn to automatically recognize complex patterns and make intelligent predictions for a class.

The network intelligence 326 is generated in substantially real time and generally provides a behavior profile of current and potential end users alone, collectively, or in subsets. The network intelligence 326 may include customer analytics 328, an aggregated data feed 330, and/or recommendations for inventory placement 332.

In one implementation, the customer analytics 328 represents transactions of the end users in the secondary network. Stated differently, the customer analytics 324 provides statistics and demographics of the end users, as well as a behavior profile specifying the activity of end users corresponding to the secondary network. In one implementation, the customer analytics 328 provides a distribution of where network traffic is transceived geographically. For example, the customer analytics 328 may show that Florida generates the most traffic to the secondary network. The customer analytics 328 may specify various activities of end users, including, without limitation, how end users are directed to the secondary network (e.g., via a search, manual entry of a URL, via a link in an advertisement or referral source), transactions or activities of end users after leaving the secondary network (e.g., visit a competing network), or the like. Further, the customer analytics 328 may distinguish and provide statistics on how many end users are new and how many are repeat users.

The customer analytics 328 may be aggregate or filtered. In one implementation, the customer analytics 328 provides information on interests of the end users in different geographical regions, which the company operating the secondary network may use to increase traffic to the secondary network. For example, the customer analytics 328 may reveal that eighty percent of end users in Denver stream music from a particular website. This information may be used to provide targeted advertisements for the secondary network to Denver end users streaming music from the particular website. Similarly, if a competitor is high on the interest list for a particular geographical region or as a whole, the company operating the secondary network may determine the cause and adjust its advertising strategies and/or business model accordingly. Stated differently, if a competitor of a company providing music streaming services, for example, is high on the interest list for Florida users, the company may adjust its strategies to increase the Florida users' interest in the company's music streaming services. In another implementation, the customer analytics 328 provides statistics and distributions of the top referral sources to the secondary network, which may provide information on the effectiveness and value of various advertisements and/or relationships with other networks. In still another implementation, the customer analytics 328 provides trends, including a historical behavior profile and a predicted behavior profile. Stated differently, the customer analytics 328 may show what end users have done in the past and what they are reasonably likely to do in the future. For example, the customer analytics 328 may show that end users in Denver are likely to visit a particular shopping website around Thanksgiving, which may be useful for determining an advertising strategy for the company operating the secondary network. The predicted behavior profile may further be useful for the company to determine when to add inventory to meet anticipated customer demands.

In one implementation, the aggregated data feed 330 determines an influence of an action on network traffic to the secondary network. Stated differently, the aggregated data feed 330 correlates an action to any change in traffic to the secondary network with reasonable certainty. The aggregated data feed 330 identifies a behavior profile of end users prior to and after an action occurs to obtain a measurement of lift to correlate the action to any change in network traffic to the secondary network. The action may be: a single advertisement; an advertisement campaign; one or more popular culture, political, or news events; or the like. The influence of the action may be shown in substantially real time or may be a trend over a timeframe. Historical trends, for example, may be used to analyze an overall effect of a campaign, to identify a change in customer base, or to make predictions about the future.

The aggregated data feed 330 may be aggregate or filtered by topic or geographical location to show, for example, what the end users are doing within the secondary network, what the end users are doing outside of the secondary network, what geographical locations or demographics an advertisement is reaching and/or generating a response to the advertisement, or the like.

For example, the action may be an advertisement for a sports car sold by the company operating the secondary network that was broadcast during a television show, and the aggregated data feed 330 determines the impact and value of the advertisement. The aggregated data feed 330 may: correlate the influence of the broadcast of the advertisement to any change in traffic to the secondary network; determine whether the advertisement generated a response (e.g., end users purchased the sports car); correlates any changes in the behavior profile of the end users to the advertisement (e.g., before the advertisement, end users were searching for a minivan, and after the advertisement, end users are searching for the sports car); or the like.

In one implementation, the recommendation for inventory placement 332 identifies one or more relevant pieces of inventory (e.g., an advertisement) to present to end users, for example, before during, or after the presentation of content served by a CDN. When a user device requests the content, the analytics engine 322 correlates the IP address of the user device to a behavior profile determined using the network intelligence 326. The recommendation for inventory placement 332 identifies relevant inventory based on the behavior profile, including the geographic location of the IP address. In one implementation, the recommendation for inventory placement 332 also correlates the behavior profile to an inventory type to assign a relevancy value to the inventory. For example, a local advertisement or an advertisement matching the interests of the end user may have a higher relevancy. The recommendation for inventory placement 332 provides targeted advertisements that end users are interested in and to which end users are most likely to respond. Thus, end users viewing the same content may receive different advertisements based on the recommendations for inventory placement 332.

The recommendation for inventory placement 332 may also analyze the available inventory to identify any conflicts, for example, to prevent an advertisement for a competitor from being presented. For example, if an end user is viewing content from a content provider, the recommendations for inventory placement 332 will prevent an advertisement for a competing content provider from being provided to the end user during the presentation of the content. The recommendation for inventory placement 332 may also depend on characteristics of the target placement, such as the size of an available space for the inventory placement and whether the bandwidth of the inventory matches the bandwidth of the content. As an example, a news webpage may have a 300 by 200 square pixel space available for inventory placement. The recommendation for inventory placement 332 identifies available inventory that could fit in the 300 by 200 square pixel space. Similarly, a video streaming at a bandwidth of 700 kbps may have a segment in the video presentation reserved for presenting inventory, so the recommendation for inventory placement 332 identifies available inventory that could be streamed at a bandwidth of 700 kbps.

In one implementation, the recommendation for inventory placement 332 identifies relevant inventory and initiates a real time bidding platform for the owners of the relevant inventory to bid on placement. The inventory owned by the winner of the bid is then placed (e.g., served to the IP address before, during, or after presentation of the content). For example, an end user may request a URL for a website. While the website loads, the recommendation for inventory placement 332 identifies space on the website for inventory placement and three advertisements as relevant inventory. The owners of the advertisements bid on the placement, and the highest bidder is selected. Once the website loads, the advertisement of the highest bidder is displayed in on the website in the space, and the owner of the placed advertisement is charged. Due to the short time this process occurs during, in one implementation, thresholds for each of the inventory may be set to make the real time bidding an automatic process. For example, an owner may set an opening bid amount, an incremental bid amount, and a maximum bid amount for specific inventory. If the recommendation for inventory placement 332 identifies the specific inventory as relevant inventory and offers a placement for bidding, the opening bid amount is automatically bid. If other owners are participating in the bidding, the bid amount will be automatically raised by the incremental bid amount until the specific inventory wins the placement or the maximum bid amount is reached. The bid amounts may be set based on a value of the available inventory placement, the behavior profile of the end user(s), an importance or value of the specific inventory, and/or the like. For example, a placement during a popular television or sporting event may have a higher value than a placement on a webpage for a local restaurant, so the bid amounts may be set higher for the placement during the television show or sporting event. Similarly, the bid amounts may be adjusted to higher amounts where a behavior profile of end user(s) indicates a higher interest or likelihood of being responsive to the specific inventory. Further, where the specific inventory is of greater importance to the owner (e.g., for a new product the owner is trying to introduce into the market), the bid amounts for the specific inventory may be set higher.

The network intelligence 326 is generated and output in substantially real time in a format enabling further action, management, analysis, and/or merging with other data sources. For example, the network intelligence 326 may be output for display on a graphical user interface, in one or more electronic data feeds, on a printout, as one or more web services, as business logic, or the like. In one implementation, the network intelligence 326 is a visual representation in the form of an interactive map, a list, a chart, or the like. For example, selecting a geographical location on the map may display statistics of what websites were visited by end users in that location over time. The network intelligence 326 may be anonymized to provide general information on user behavior without providing personal information of the end users.

Figure 4:
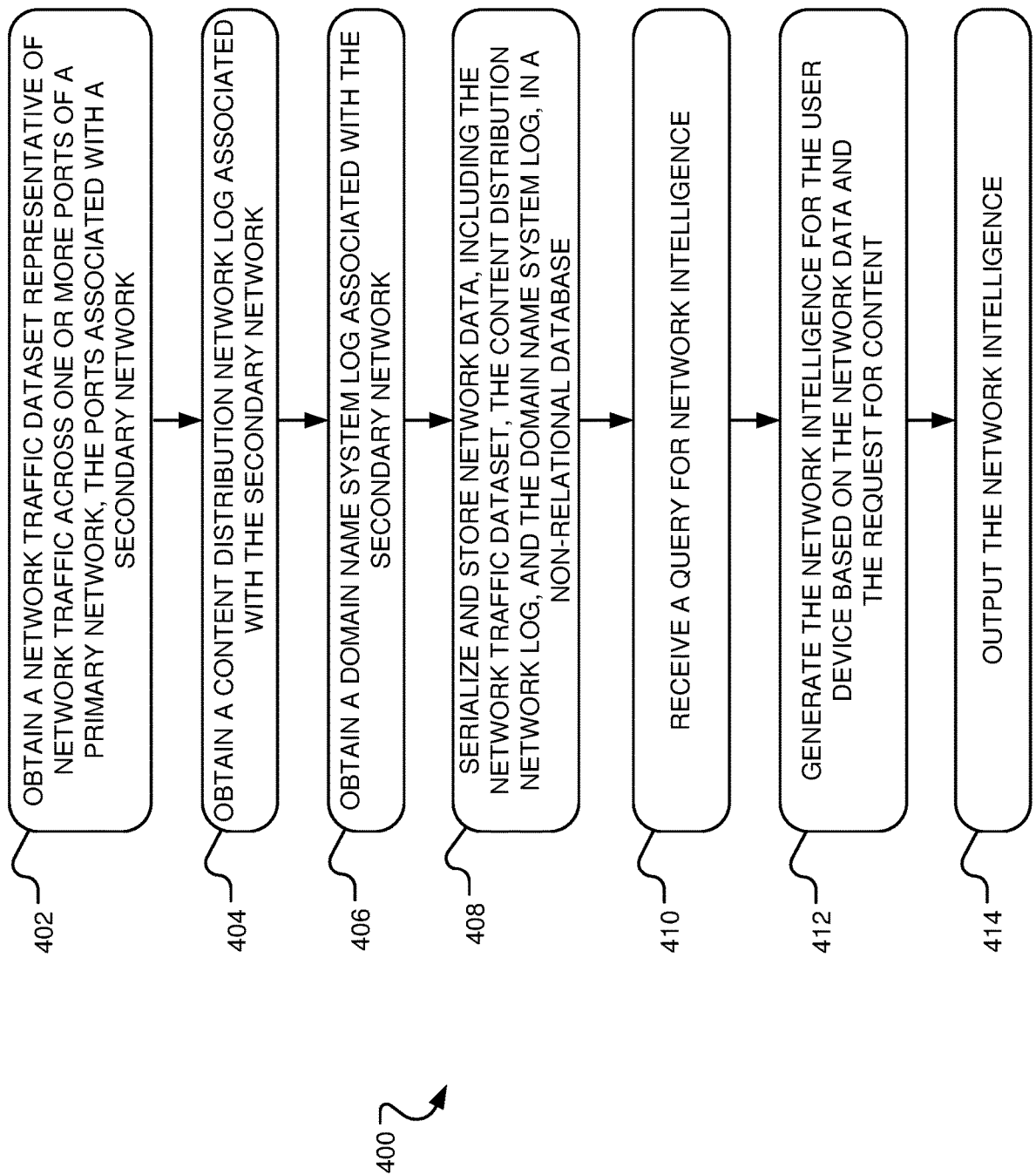
FIG. 4 illustrates example operations for generating network intelligence based on network data.

Referring to FIG. 4, example operations 400 for generating network intelligence based on network data are shown. In one implementation, an operation 402 obtains a network traffic dataset representative of network traffic across one or more ports of a primary network. The ports may be associated with a secondary network. For example, the secondary network may be a content provider network or other network in communication with the primary network that provides a product or service to end users. The operation 402 obtains the network traffic dataset by monitoring and correlating network traffic over ports in the primary network to determine statistics and rates of network traffic associated with the secondary network.

In one implementation, the operation 402 captures network traffic data on edge routers of the primary network and enriches the network traffic data using BGP data, router details, location information, volume adjustment data, customer identifiers, and/or the like. Stated differently, the operation 402 gathers network traffic data from the interaction of the primary network with the secondary network and one or more customer networks and correlates the network traffic data to and from the network traffic dataset. The network traffic dataset provides information about sources, destinations, ingress/egress points, and other information about network traffic across the primary network that is associated with the secondary network. In other words, the network traffic dataset may be used to evaluate network behavior and network traffic patterns of the primary network with respect to network traffic transceived between the secondary network and end users at various geographical locations.

An operation 404 obtains a CDN log associated with the secondary network. The CDN log includes a history of content that is requested by various end users and served to the end users from the secondary network. The CDN log further includes information on the type content and the network addresses of the various end users (e.g., an IP address of a user device or an edge device) that requested and received the content. An operation 406 obtains a DNS log associated with the secondary network. The DNS log includes a list of DNS requests and information about the requests, including the network addresses request are resolved to and the requesting network addresses.

An operation 408 serializes and stores the network data, including the network traffic dataset, the CDN log, and the DNS log in one or more non-relational databases. The operation 408 may further serialize and store other data, including one or more enrichments feeds having data correlated with the end users (e.g., with the network addresses of the user devices or the edge devices), in the one or more non-relational databases.

In one implementation, an operation 410 receives a query for network intelligence. The operation 410 processes the query in multiple parts, and an operation 412 aggregates the results to generate the network intelligence in substantially real time. In one implementation, the operation 410 receives the query in response to a request for content from a user device, and the query corresponds to the IP address associated with the user device requesting the content. The operation 412 extracts and aggregates the network data stored in the one or more non-relational databases to generate the network intelligence.

Stated differently, the operation 412 generates network intelligence based on network data including, the network traffic dataset, the CDN log, and the DNS log. In one implementation, the operation 412 further generates the network intelligence based on the one or more enrichment feeds. The aggregation and correlation of the network data provides network intelligence that includes a behavior profile of end users collectively, in subsets, and/or individually, for example, with respect to the secondary network. The behavior profile may be anonymized to provide network intelligence while protecting the privacy of the end users. Further, the behavior profile may be based on timestamped network data to provide network intelligence in substantially real time or as historical trends over a timeframe.

In one implementation, the operation 412 generates customer analytics representative of transactions of end users corresponding to the secondary network. The operation 412 may aggregate the customer analytics based on a variety of factors, including, without limitation, geographic location, the activity of end users, or the like. The activity of end users may include previous transactions directing the end user to the secondary network. For example, the previous transactions may include what the end users were doing prior to being directed to the secondary network (e.g., running a search, visiting a competitor's website, etc.), how the end users were directed to the secondary network (e.g., selecting a link in an advertisement, manually entering a URL, utilizing a search engine, etc.), or the like. Similarly, the activity of end users may include subsequent transactions, such as what the end users did after leaving the secondary network (e.g., visit a competitor's website). The activity of end users may further include high traffic sites for a particular demographic and/or during a specific timeframe. For example, the customer analytics may specify what networks or websites are frequently visited by 18-25 year olds in the Denver area during the holidays.

In another implementation, the operation 412 generates an aggregated data feed specifying an influence of an action on network traffic to the secondary network. Stated differently, the aggregated data feed correlates an action to any change in traffic to the secondary network with reasonable certainty. The action may be: a single advertisement; an advertisement campaign; one or more popular culture, political, or news events; or the like. For example, the action may be an advertisement for the company operating the secondary network that was broadcast during a television show, and the operation 408 generates an aggregated data feed that correlates the influence of the broadcast of the advertisement to any change in traffic to the secondary network to measure the impact and value of the advertisement. The operation 408 may generate an aggregated data feed measuring the influence of the action in substantially real time or may be a trend over a timeframe. The operation 412 may also filter the aggregated data feed by topic.

In still another implementation, the operation 412 generates a recommendation for inventory placement. The inventory may include, without limitation, an advertisement for the company operating the secondary network. For example, the recommendation may be for an advertisement to be shown before, during, or after the presentation of content, such as a movie or song. In one implementation, the recommendation includes at least one of: a behavior profile of one or more of the IP addresses; a size of an available space for the inventory placement; an inventory content type; or an identification of relevant inventory available for placement.

Figure 5:
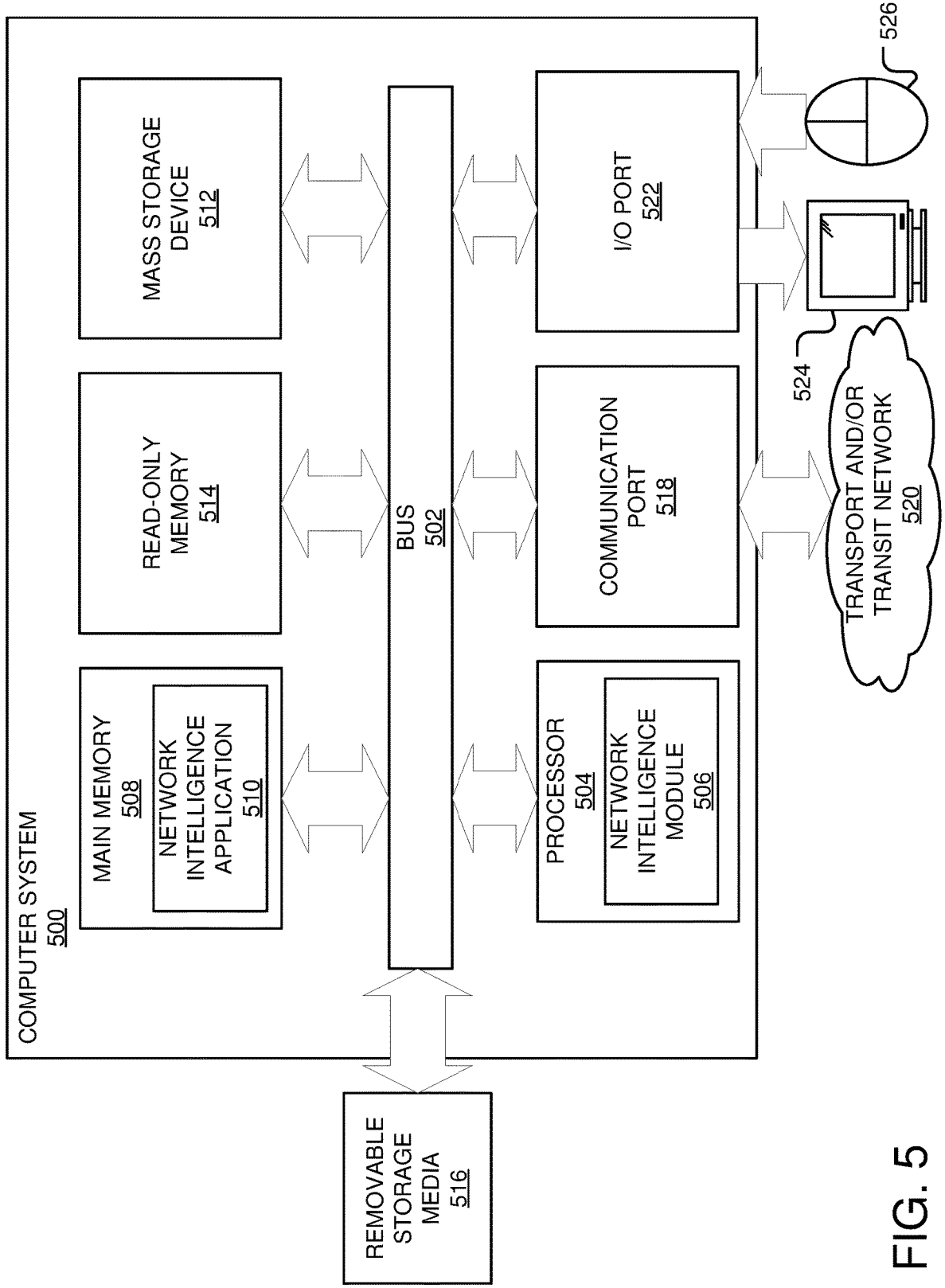
FIG. 5 is an example computing system that may implement various systems and methods discussed herein.

An operation 414 outputs the network intelligence in a format enabling further action, management, analysis, and/or merging with other data sources. In one implementation, the operation 414 outputs a representation of the network intelligence for display on a graphical user interface. For example, the operation 414 may output a visual representation of customer analytics in the form of a map showing a distribution of network traffic corresponding to the secondary network by demographic. In other implementations, the operation 414 outputs the network intelligence as one or more web services, business logic, one or more electronic data feeds, one or more printouts, or the like FIG. 5 is an example computing system 500 that may implement various systems and methods discussed herein. The computer system 500 includes one or more components connected via a bus 502. In one implementation, the computer system includes at least one processor 504. The processor 504 may include one or more internal levels of cache (not shown) and a bus controller or bus interface unit to direct interaction with the bus 502. The processor 504 may include a network intelligence module 506 that specifically implements the various methods and systems discussed herein. Main memory 508 may include one or more memory cards and a control circuit (not shown) or other forms of removable memory and may store a network intelligence application 510 including computer executable instructions, that when run on the processor, implement the methods and system set out herein. Other forms of memory, such as mass storage device 512, read only memory 514, and removable storage media 516, may also be included and accessible, by the processor 502 via the bus 502.

The computer system 500 may further include a communication port 518 connected to a transport and/or transit network 520 by way of which the computer system 500 may receive network data useful in executing the methods and system set out herein as well as transmitting information and network configuration changes determined thereby. The computer system 500 may include an I/O port 522 connected to an I/O device, or other device, by which information is displayed, such as at display screen 524, or information is input, such as input device 526. The input device 526 may be alphanumeric input device, including alphanumeric and other keys for communicating information and/or command selections to the processor. The input device 526 may be another type of user input device including cursor control, such as a mouse, a trackball, or cursor direction keys for communicating direction information and command selections to the processor 504 and for controlling cursor movement on the display device 524. In the case of a tablet device, the input may be through a touch screen, voice commands, and/or Bluetooth connected keyboard, among other input mechanisms. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for generating network intelligence comprising:
obtaining, by at least one computer processor, a network traffic dataset representative of network traffic across one or more ports of a primary network, the ports associated with both a secondary network and a customer network in communication with the primary network;
obtaining a content distribution network log associated with the secondary network, the content distribution log comprising a history of content requests; and
generating, by the at least one computer processor, the network intelligence based on the network traffic dataset and the content distribution network log using at least one processor, the network intelligence providing a behavior profile corresponding to the one or more Internet Protocol addresses.

2. The method as recited in claim 1, wherein the network traffic dataset comprises at least one of a router identifier, an interface identifier associated with a particular router, an origin Autonomous System (AS) number, and a destination AS number.

3. The method as recited in claim 1, wherein the network traffic dataset comprises an approximation of at least one of a rate of network traffic and an amount of network traffic transceived at an edge router between the primary network and the secondary network.

4. The method as recited in claim 3, wherein the approximation is based on information collected from using Simple Network Management Protocol (SNMP) counters and messaging.

5. The method as recited in claim 1, wherein the network traffic dataset comprises information associated with Border Gateway Protocol (BGP) tables corresponding to connectivity relationships between the primary network, the secondary network, and the customer network.

6. The method as recited in claim 1, wherein the network traffic dataset specifies identify information associated with a sender and a receiver of a data transmission over the primary network.

7. The method as recited in claim 6, wherein the identity information comprises at least one of a router interface identifier, an Internet Protocol (IP) address, and a router device identifier.

8. The method as recited in claim 1, further comprises:
obtaining a domain name system log associated with the secondary network, the domain name system log comprising one or more Internet Protocol addresses; and
wherein generating the network intelligence is further based on the domain name system log.

9. One or more non-transitory tangible computer-readable storage media storing computer-executable instructions for performing a computer process on a computing system, the computer process comprising:
obtaining network data corresponding to a secondary network in communication with a primary network, wherein the network data comprises:
a network traffic dataset representative of network traffic across one or more ports of the primary network associated with both the secondary network and a customer network in communication with the primary network; and
a content distribution network log comprising a history of content requests;
serializing the network data; and
storing the network data in a storage cluster.

10. The one or more non-transitory tangible computer-readable storage media as recited in claim 9, wherein the network traffic dataset comprises at least one of a router identifier, an interface identifier associated with a particular router, an origin Autonomous System (AS) number, and a destination AS number.

11. The one or more non-transitory tangible computer-readable storage media as recited in claim 9, wherein the network traffic dataset comprises an approximation of at least one of a rate of network traffic and an amount of network traffic transceived at an edge router between the primary network and the secondary network.

12. The one or more non-transitory tangible computer-readable storage media as recited in claim 11, wherein the approximation is based on information collected from using Simple Network Management Protocol (SNMP) counters and messaging.

13. The one or more non-transitory tangible computer-readable storage media as recited in claim 9, wherein the network traffic dataset comprises information associated with Border Gateway Protocol (BGP) tables corresponding to connectivity relationships between the primary network, the secondary network, and the customer network.

14. The one or more non-transitory tangible computer-readable storage media as recited in claim 9, wherein the network traffic dataset specifies identify information associated with a sender and a receiver of a data transmission over the primary network.

15. The one or more non-transitory tangible computer-readable storage media as recited in claim 14, wherein the identity information comprises at least one of a router interface identifier, an Internet Protocol (IP) address, and a router device identifier.

16. The one or more non-transitory tangible computer-readable storage media as recited in claim 9, wherein the network data further comprises a domain name system log comprising one or more network addresses.

17. A system for generating network intelligence comprising:
a storage cluster, by at least one computer processor and configured to generate the network intelligence based on network data obtained from an interaction of a primary network with a secondary network and at least one customer network, the network data comprising:
a network traffic dataset corresponding to network traffic transceived over one or more router interfaces in the primary network between one or more edge devices in the at least one customer network and the secondary network; and
a content distribution log comprising a history of content requests from the one or more edge devices over the primary network.

18. The system as recited in claim 17, wherein the network traffic dataset comprises at least one of a router identifier, an interface identifier associated with a particular router, an origin Autonomous System (AS) number, and a destination AS number.

19. The system as recited in claim 17, wherein the network traffic dataset comprises an approximation of at least one of a rate of network traffic and an amount of network traffic transceived at an edge router between the primary network and the secondary network, the approximation based on information collected from using Simple Network Management Protocol (SNMP) counters and messaging.

20. The system as recited in claim 17, wherein the network traffic dataset comprises information associated with Border Gateway Protocol (BGP) tables corresponding to connectivity relationships between the primary network, the secondary network, and the customer network.

21. The system as recited in claim 17, wherein the network traffic dataset specifies identify information associated with a sender and a receiver of a data transmission over the primary network.

22. The system as recited in claim 21, wherein the identity information comprises at least one of a router interface identifier, an Internet Protocol (IP) address, and a router device identifier.

23. The system as recited in claim 17, wherein the network data further comprises a domain name system log comprising a network address of each of the one or more the edge devices and one or more network addresses associated with the secondary network.

\* \* \* \* \*